United States Patent

[11] 3,626,316

[72] Inventor Raymond S. Connell, Jr.
Adelphi, Md.

[21] Appl. No. 889,538
[22] Filed Dec. 31, 1969
[45] Patented Dec. 7, 1971
[73] Assignee H. B. Engineering
Silver Springs, Md.

[54] SIGNALLING DEVICE
16 Claims, 5 Drawing Figs.

[52] U.S. Cl. .......... 331/56,
307/308, 331/64, 331/66, 340/227, 340/416
[51] Int. Cl. .......... H03b
[50] Field of Search .......... 307/308;
328/1; 331/64–66, 56; 330/22, 40; 340/213, 227,
416

[56] References Cited

UNITED STATES PATENTS

| | | | |
|---|---|---|---|
| 3,051,932 | 8/1962 | Cressey et al. .......... | 331/65 X |
| 3,266,030 | 8/1966 | Sadler .......... | 331/65 X |
| 3,501,711 | 3/1970 | Moran .......... | 330/40 X |

*Primary Examiner*—Roy Lake
*Assistant Examiner*—James B. Mullins
*Attorney*—Dike, Bronstein, Roberts & Cushman

ABSTRACT: A controlled current signalling device for use with transmission lines, said device including a current source adapted to be coupled across the transmission lines and having a high output impedance in comparison to the impedance of transmission lines and modulation means adapted to modulate the current source in accordance with a sensed input signal, said current source adapted to maintain its high output impedance during modulation thereof.

INVENTOR
RAYMOND S. CONNELL, JR
BY
Llike, Thompson & Bronstein
ATTORNEYS

INVENTOR
RAYMOND S. CONNELL, JR
BY
Dike, Thompson & Bronstein
ATTORNEYS

SIGNALLING DEVICE

This invention is directed to signalling devices and more particularly to line-powered signalling devices suitable for direct coupling across a transmission line.

The signalling devices of this invention can be applied to transmission line systems such as used in Community Antenna Systems (CATV), or in telephone systems and the like, wherein a DC voltage is applied to the line.

For many years, there have been many proposals for signalling schemes to be used in conjunction with transmission lines going to homes and commercial establishments. To date, some schemes have been adapted for using signalling sources which superimpose a signal, representative of an occurrence such as the actuation of a fire alarm, on a transmission line which is then detected at a central location.

Up to the present time most of such signalling schemes have thought it necessary to match the output impedance of the signalling device to the characteristic impedance of the line in order to achieve maximum power transfer. When such systems have been constructed with multiple signalling units, noise and interference have generally resulted, making it difficult to distinguish between different signals placed on the line at different points.

More recently, a line-powered signalling system has been proposed which is constructed so that it only draws current from the line when it is activated such as by the actuation of a fire alarm. This type of system is additionally operated so that the transistor power driver therefore is either in saturation or at cutoff and a linear load coupled between the collector of the transistor driver and the line is utilized to provide a current waveform on the line.

When multiple numbers of signalling devices, of the last mentioned type are simultaneously conducting on the line, mutual interference between signalling devices has occurred which has resulted in distorted and noisy signals which are extremely difficult to differentiate between in order to determine which signalling devices have been activated. In addition, the operation of the last mentioned signalling devices seriously effects the characteristic impedance of the line and accordingly causes mismatching between other units being driven from the line and therefore loss in received signal power normally being carried by the line.

For these reasons a new and improved signalling device was required. The device must at all times have a high output impedance in comparison to the characteristic impedance of the line and in addition must not cause substantial mutual interference when more than one device is simultaneously actuated. Further, in order to decrease power consumption, if large numbers of signalling devices are utilized, the signalling device must consume relatively small amounts of power.

The above requirements have been met in this invention by providing a signalling device comprising a controlled current source controlled by a modulating oscillator and sensor.

In the preferred embodiments, according to the invention, the current source is coupled across the line so that it continually draws a small amount of current therethrough while at the same time appearing as a high impedance across the line.

Negative or degenerative feedback is provided as part of the controlled current source to limit current changes resulting from the interference or noise on the lines and to insure that the current source at all times appears as a high impedance, or in other words has a high output impedance. OUtput impedance is defined as the variation in current flowing through the output terminals of the signalling device as applied voltage to the output terminals is changed. In this invention there is a very small change in current with changes in applied voltage.

The current source is preferably sinusoidally mounted by an oscillator to provide a signal on the line indicative of the signalling device which has been actuated.

Accordingly, it is an object of the invention to provide a new and improved signalling device. Another object of the invention is to provide a controlled current source which in conjunction with control means is adapted to provide information signals on the line.

A further object of the invention is to provide signalling means which at all times appears as a relatively high impedance across the line even when actuated to provide identifiable signals on the line.

Still other objects of the invention will in part be obvious and will in part appear hereinafter.

For a fuller understanding of the nature and objects of the invention, reference should be had to the following detailed description, taken in connection with the accompanying drawings in which.

Figure 1:
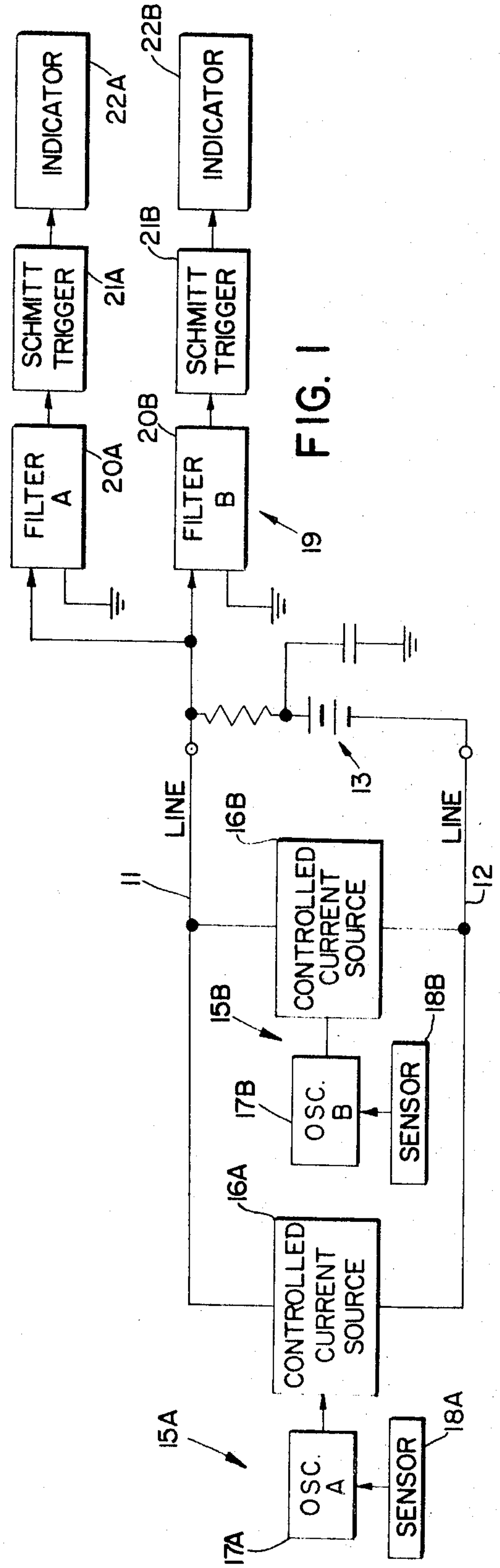
FIG. 1 illustrates in block diagram form the signalling devices of the invention as a part of a communications system.

Reference should now be had to FIG. 1, which shows a plurality of signalling devices according to the invention utilized as a part of a communications or other system which includes transmission lines which, for example, could be the transmission lines of a community antenna television system (CATV), a telephone system, or other communications system which provides electrical information to a number of subscribers. In addition, the transmission lines may be DC power transmission lines or the like.

Assuming that the signalling device of this invention is utilized in conjunction with a communications system, a DC voltage is provided across the transmission lines by a DC source such as a battery shown at 13, in addition to the usual information carrier signals carried thereby.

The DC source 13 in a system such as this is preferably coupled to the transmission lines 11 and 12 at the main office or transmitting station, rather than at some remote point along the lines as a matter of convenience.

The signalling devices of this invention are generally shown at 15A and 15B and comprise in combination a controlled current sources 16A and 16B, oscillator means 17A and 17B and sensors 18A and 18B. The signalling devices 15A and 15B provide different frequency signals on the transmission inasmuch as they are both modulated by oscillators 17A and 17B which provide different frequency modulation signals. Different modulating frequencies are preferably utilized for each signalling device to facilitate identification and location of the particular signalling device emitting information signals over the lines. The oscillators may include any of the well known types of oscillators which are capable of providing a modulating signal such as a sinusoidal signal to dynamically vary the output current provided by the controlled current sources. The oscillators are coupled to the controlled current source in a manner so as not to appreciably change the output impedance of the signalling device when coupled across the line.

The signalling devices of this invention are adapted to be placed in the home, or business location of a subscriber, (e.g., CATV subscriber) so as to be able to sense various conditions. For example, the sensor can be a heat-sensitive switch, thermometer, burglar alarm, infrared sensors, smoke detectors, photosensitive elements, movement sensitive elements, pressure transducers, valves, microphones, or any other device capable of causing or capable of producing a signal to cause a switch or like means to open or short out means to activate the oscillator controlled current source in order to provide a signal indicative of the occurrence of an event on the transmission lines. With the signalling device of this invention in its preferred form, a small quiescent (DC) current is continuously flowing through the controlled current source. This eliminates spiking noise which would occur on the line if the controlled current sources were switched into the systems upon detection of an event.

When the oscillator is caused to provide a modulating signal to the controlled current source, a linear dynamic signalling current is caused to flow through the controlled current source over the lines, said signal being adapted to be detected by detection means and said current signal being directly proportional to the input modulating signal (e.g., voltage). The oscillator, if desired, can also continuously oscillate and be connected to the controlled current source to modulate the same upon the occurrence of an event (i.e., by the closure of a switch adapted to couple the output of the oscillator to the input of the controlled current source).

In order to detect the signals placed on the lines by the signalling devices, and discriminate between the different frequency signals provided by them, there is provided a plurality of detection means shown generally at 18.

The detection means comprise narrow band-pass filters 18A and 18B, tuned to different frequencies, which are in turn coupled to voltage level detectors 19A and 19B such as a Schmitt Trigger, which in turn provides a signal to actuate an indicator 20A and 20B (i.e., light or alarm) to indicate the reception of a signal indicative of the occurrence of an event at a remote signalling device. Depending on the frequency of the detected signal, it is then possible to precisely pinpoint from which remote signalling device the signal emanated and to take the necessary action (e.g., the signal indicated a fire).

Figures 2, 5:
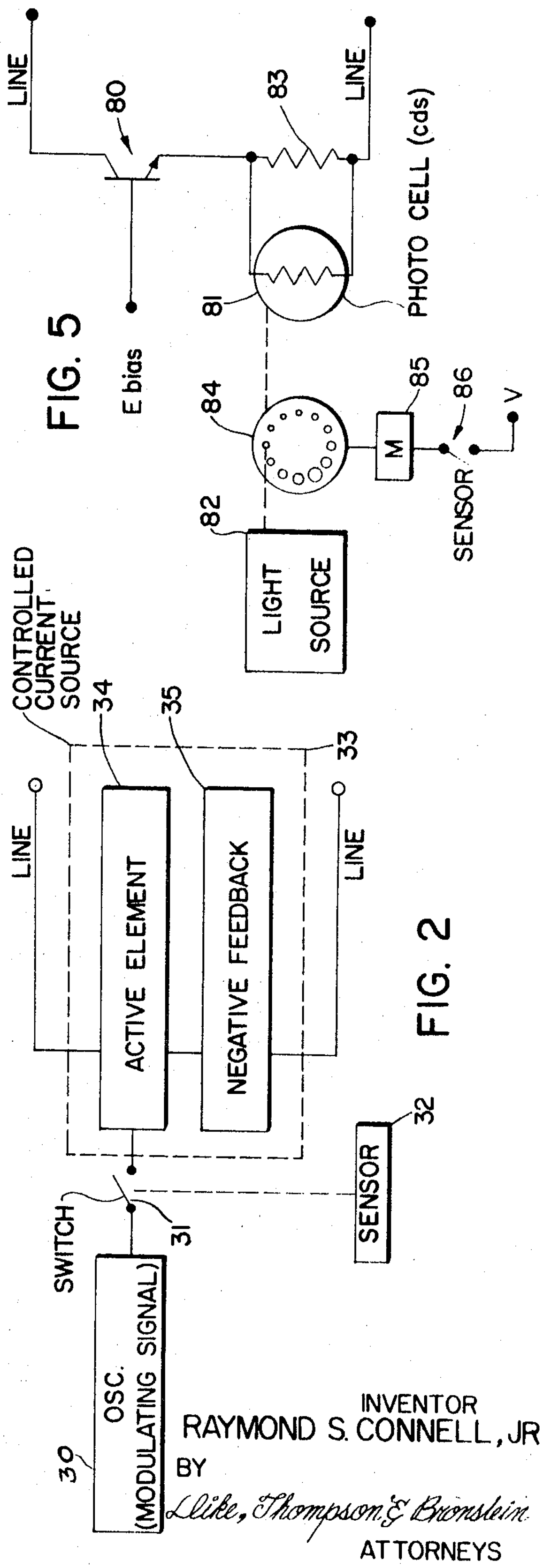
FIG. 2 is a block diagram illustrating in more detail the signalling device of the invention.
FIG. 5 is a partial block and partial schematic diagram illustrating another signalling device embodiment according to the invention.

In FIG. 2 there is shown in slightly more detail the signalling device of the present invention. The oscillator for providing the modulating signal is shown at 30 and is coupled through a switch 31 (normally open), which is closed by actuation of the sensor 32, to the controlled current source 33. The controlled current source comprises an active element 34, such as a transistor coupled to a negative or degenerative feedback means 35 which establishes the current through the active element. The negative feedback means (i.e., resistor) is of the type which counteracts attempted changes in quiescent DC current flowing through the current source as a result of noise or other disturbances on the lines.

The controlled current sources of this invention are adapted to be coupled directly across the transmission line which acts as a DC power source for the signalling devices. The controlled current sources of this invention provides a current which is substantially independent of the characteristic impedance of the line as long as the impedance of the line remains small and in addition, appears as a relatively high impedance in comparison to the characteristic impedance of the line even when modulated.

Figure 3:
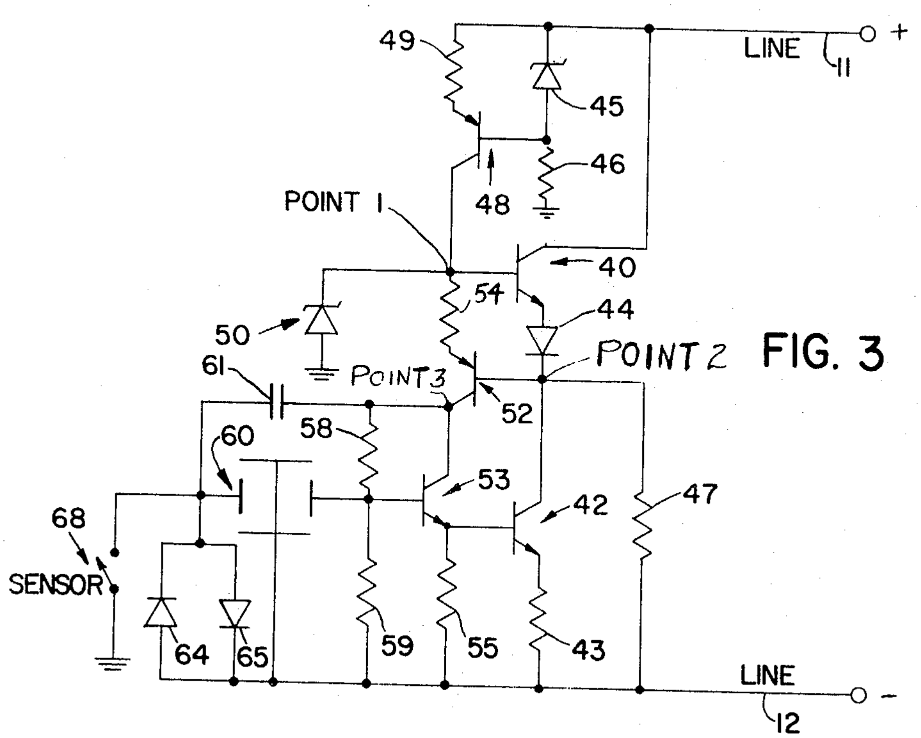
FIG. 3 is a circuit diagram of the preferred embodiment of the signal device according to the invention.

Reference should now be had to FIG. 3 which shows schematically the preferred embodiment of the line-powered signalling device of the invention.

The controlled current source comprises a first transistor (NPN) 40 coupled in series to a biasing diode 44 and to a second transistor (NPN) 42 for controlling the current flow through transistor 40. The second transistor 42 is in series with a resistor 43 which provides additional negative or degenerative feedback since it is in the emitter circuit of the transistor. The resistor 43 limits the DC current flowing through transistor 42 and therefore also limits the current flowing through transistor 40. The resistor 43 is made sufficiently large so as to limit the DC current drawn from the transmission lines 11 and 12 to a very low level (ma.). In order to initiate current flow through the transistors 40 and 42 there is provided a biasing network comprising Zener diode 45, resistors 46 and 47, PNP-transistor 48 and resistor 49 in series with it, and Zener diode 50. The resistor 43 is preferably very large, at least 10 times larger than the common base input impedance of the transistor 42.

The oscillator (modulator) network comprises PNP-transistor 52, NPN-transistor 53, collector resistor 54 and emitter resistor 55. In order to initiate oscillations, there is provided a base biasing network of resistors 58 and 59 coupled to transistor 53 and to a resonant element 60 (in this case an electromechanical transducer), which is made to oscillate by positive feedback provided from the collector of transistor 53 through a capacitor 61. Limiting of oscillator voltage is provided by diodes 64 and 65.

The symbol for the transducer used in this invention represents a device referred to as the Twintron transducer. The Twintron transducer may be purchased from H. B. Engineering, of Silver Springs, Md. and may be any of the VB series offered for sale.

A more complete description of this type of transducer may also be had by reference to U.S. Pat. application 565,430, filed July 15, 1966, or Canadian Pat. 818,066, issued July 15, 1969, by Hugh M. Baker, Jr. and assigned to the same assignee as this application.

In addition, the Oct. 1967 magazine issue of "Electronics" may be referred to for a further description of the Twintron transducer. It should be understood that other types of electromechanical resonating elements can also be used, as for example an audio band piezoelectric transducer (tuning fork), but the above-mentioned type of transducer is preferred because of it being able to operate satisfactorily without drawing large amounts of current. In order to maintain lower power consumption in the oscillator circuitry, the transducer used should be coupled to a high impedance source. This is provided as shown by loading the collector of transistor 53 with transistor 52.

To initiate oscillations, a sensor switch 68 which is normally closed thus shortening the input of the transducer 60 to ground, is opened by the occurrence of an event (e.g., melting of a heat-responsive element). This permits noise in the circuit to be fed back to the input to the transducer 60 to turn it on so that it provides a sinusoidal output signal at one resonant frequency to the base input of transistor 53 which is then fed back through the capacitor 61 to reinforce oscillations.

In order to describe the operation of the device of FIG. 3, the drawing has been labeled with points 1, 2 and 3. If we assume now that the signalling device is connected across lines 11 and 12, which provides, for example 10 volts DC and the sensor switch shown at 68 is closed, transistor 48 turns on since its base becomes forward biased through Zener diode 45 and biasing resistor 48. It should be understood the line can provide more than 10 volts DC depending on the transistors or actual elements being used. This then causes Zener diode 50 to conduct thereby providing a voltage (in this case about +7 volts because of the type of Zener diode used) at point 1. Since point 2 is less positive than point 1, transistor 52 now turns on. At this time, point 3 begins to rise in voltage and transistor 53 turns on, the current flow thereof being limited by the resistor 55. The turning on of transistor 53 causes transistor 42 to turn on which in turn causes transistor 40 to turn on as current begins to flow through the biasing diode 44 in series therewith. The current through the transistors 40 and 42 reaches a quiescent (DC) value which is limited by the size of the resistor 43.

If we assume now, that switch 68 opens (for example, a metal wire is heated by a fire so that it opens), noise in the circuitry causes transducer 60 to oscillate at one resonant frequency which is applied to the base of transistor 53 to modulate the current in transistors 42 and 40 around its quiescent value. The information on the current signal as represented by the frequency of modulation, may then be detected in a manner well known to the art. The modulating signal is of an amplitude such that the transistor current sources, (controlled current source) is not permitted to go into saturation. The modulating signal may be a sine wave or complex waveforms which may be represented as sums of differences of sine waves.

Figure 4:
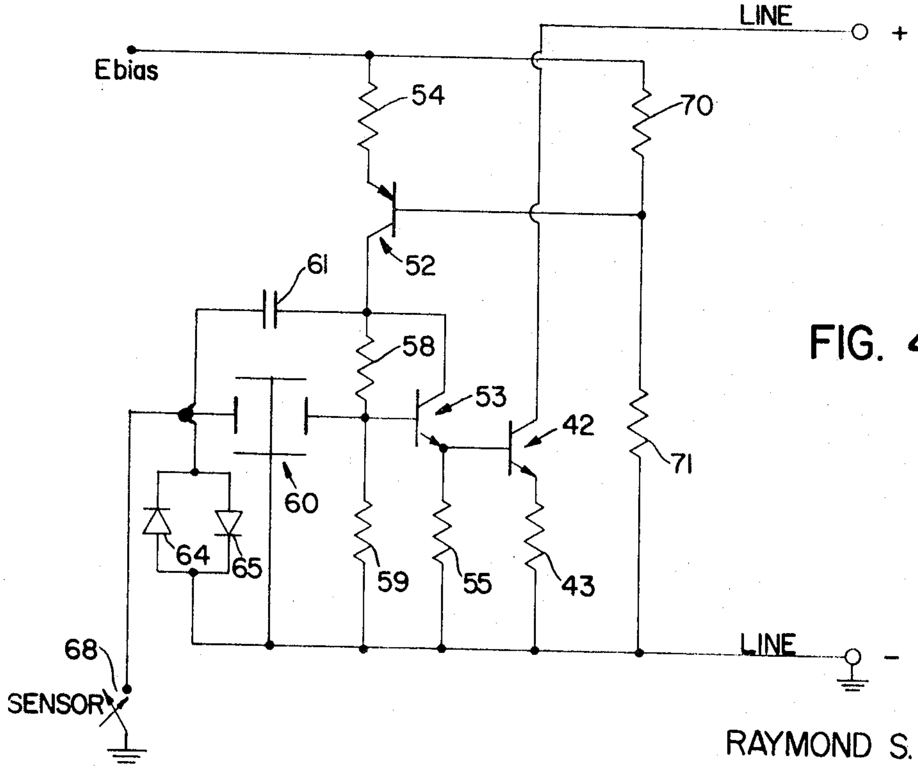
FIG. 4 is a circuit diagram illustrating another embodiment according to the invention.

In FIG. 4 there is shown a modification of the circuitry of FIG. 3. In this figure the current flowing through the signalling device is modulated in the base circuit thereof rather than in the emitter circuit as shown in FIG. 3.

The components of the circuit of FIG. 4 are the same as the components of FIG. 3 and accordingly, the numbers of FIG. 3 where applicable are carried forward into this FIGURE. Instead of the biasing network shown previously for starting conduction through transistor 52, there is provided a biasing network comprising resistors 70 and 71 coupled to a biasing voltage (of the correct polarity) to cause transistor 52 to turn on.

This voltage can be provided externally by a secondary source if desired.

Reference should now be had to FIG. 5 which shows a device for modulating the controlled current source by modulating the magnitude of the resistance in series with the emitter of the controlled current source transistor shown at 80.

This is accomplished by connecting a photocell 81, which changes its resistance in accordance with received light provided by a light source 82, across an emitter resistor 83. A photocell for accomplishing the above can be a Cds type of photocell. The light provided to the photocell is modulated by a disc 84 rotated by a motor 85 energized by actuation of the sensor switch shown at 86. The disc, because of the different size and hole, and their arrangement about the periphery thereof, causes the light to vary substantially sinusoidally about a set value of resistance.

Thus, there has been provided a new and improved signalling means which utilizes a line power controlled current source for providing information on the transmission line. The signalling device of this invention can be directly powered from a remote power source and because of the fact that it is a current source and has a high dynamic output impedance which is primarily a function of the transistor gain characteristics and not of the value of the emitter resistor. The dynamic impedance of the controlled current signalling device of this invention is at least 10 times and preferably 50 to 200 or more times larger than the characteristic impedance of the line [which is generally less than about 1,000 ohms] and accordingly it does not substantially effect the characteristic impedance of the transmission line even if more than one signalling device is on.

In addition, the operation of the signalling device is such that there is preferably always current flowing through the source even during the modulation thereof, (i.e., the transistors 40 and/or 42 are not allowed to cut off or saturate).

Further, the dynamic impedance characteristics of the controlled current signalling device is such that it is possible to locate a plurality of such devices at any single location on the line without causing mutual interference difficulties.

It is to be understood that the principals of this invention may be applied to various other devices performing similar functions, and it should also be understood that NPN-transistors and PNP-transistors can be used interchangeably assuming the bias conditions are changed without departing from the principals of this invention.

It will thus be seen that the objects set forth above, among those made apparent from the preceding description, are efficiently attained and since certain changes may be made in the foregoing constructions and systems without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which as a matter of language be said to fall therebetween.

I claim:

1. A signalling device for use with a transmission line having a characteristic impedance comprising a controlled current source having outlet connections to couple it across the transmission line, means for establishing a quiescent DC current flow through said current source, input signal means for linearly modulating with an input signal voltage the current flowing through said current source about its quiescent valve such that output current is proportional to the input voltage, and voltage limit means coupled to said input signal means for limiting input signal voltage to prevent saturation of said controlled current source.

2. A signalling device according to claim 1 wherein degenerative feedback means is provided as part of the current source for limiting changes in current through the current source in the event of noise or voltage changes on the line.

3. A signalling device according to claim 2 in which said current source continuously conducts a DC quiescent current therethrough when coupled to said transmission line.

4. A signalling device according to claim 3 in which said means for modulating provides a signal for varying the current through the current source about its quiescent value.

5. A device according to claim 4 in which said means for modulating provides a sinusoidal signal for dynamically varying the current through the source without substantially reducing the output quiescent or dynamic impedance of the signalling device.

6. A device according to claim 1 in which said current source comprises a first transistor and a second transistor in series therewith, said second transistor establishing the DC quiescent current flowing through said first transistor and said second transistor being coupled to said input signal means coupled to the second transistor to modulate the current flowing through said first transistor about its DC quiescent valve.

7. A signalling device according to claim 6 in which a resistor is coupled in series with the second transistor and has a resistance of at least ten times larger than the common base input impedance of the second transistor.

8. A signalling device according to claim 1 in which said controlled current source is constructed such that it has a dynamic impedance when modulated and connected across the line which is at least ten times larger than the characteristic impedance of the line.

9. A signalling device according to claim 1 in which voltage limit means is coupled to said input signal means to prevent cutoff of said controlled signal source.

10. A system comprising a transmission line having a characteristic impedance, a DC source coupled to said transmission line, a plurality of controlled current sources each coupled across said transmission line and each powered therefrom, means coupled to each of said controlled current sources and to said line for establishing a continuous DC quiescent current flow through each of said controlled current sources, a different modulation means coupled to each of said controlled current sources, each modulation means providing a modulation signal at a different frequency and each of said modulation means providing input signals for dynamically varying the current flowing through each of said sources about the DC quiescent current flow, and means for maintaining the output impedance of each said current sources at least ten times larger than the characteristic impedance of the transmission line while being modulated by input signals from said modulation means.

11. A system according to claim 10 in which said means for maintaining the output impedance of each of said controlled sources includes means for preventing saturation of each of said controlled current sources.

12. A system according to claim 11 in which each modulation means for varying the current of each of the sources comprise modulation means providing sinusoidal signals.

13. A system according to claim 10 in which each of said source includes degenerative feedback means coupled thereto for limiting the effect of line voltage variations upon the DC quiescent current flowing through the sources.

14. A signalling device for coupling to a transmission line having a characteristic impedance and carrying a DC voltage across it, said device comprising a controlled current source which includes a first transistor coupled in series with a second transistor for controlling the current flow through it, a resistor in series with said first and second transistor for providing negative feedback to limit the DC current flow through both of said transistors when both transistors are coupled to the transmission line, a biasing network coupled to said transmission line for initiating DC current flow through said transistors, an oscillator network for applying a modulating voltage to said second transistor to modulate the current flow through said first and second transistors, and oscillator network including means for limiting the modulating voltage to prevent saturation of the first and second transistors.

15. A device according to claim 14 in which a diode is coupled in series between said first and second transistors and in which the biasing circuit operates to first initiate current flow through said second transistor thereby initiating current flow through said diode to turn said first transistor on.

16. A device according to claim 14 in which said oscillator network comprises a transducer, means coupled to line for biasing the transducer, a third transistor coupled to said transducer and to said second transistor, means for providing positive feedback between the third transistor with a fourth transistor in series therewith to limit power consumption by raising the impedance seen by the transducer.

* * * * *